United States Patent [19]

Genma

[11] Patent Number: 4,547,850
[45] Date of Patent: Oct. 15, 1985

[54] PRIORITY CONTROL METHOD AND APPARATUS FOR COMMON BUS OF DATA PROCESSING SYSTEM

[75] Inventor: Hideaki Genma, Hadano, Japan

[73] Assignee: Hitachi, Ltd., Tokyo, Japan

[21] Appl. No.: 549,806

[22] Filed: Nov. 8, 1983

[30] Foreign Application Priority Data

Nov. 17, 1982 [JP] Japan .............................. 57-200435

[51] Int. Cl.⁴ .............................................. G06F 3/00
[52] U.S. Cl. ................................................... 364/200
[58] Field of Search ...................... 364/200 MS File; 340/825.5, 825.51

[56] References Cited

U.S. PATENT DOCUMENTS 4,096,571 6/1978 VanderMey ........................ 364/200

Primary Examiner—Raulfe B. Zache
Attorney, Agent, or Firm—Antonelli, Terry & Wands

[57] ABSTRACT

In a system of the type in which processing units and terminal devices are connected to a common bus so that messages can be transmitted and received between these units and devices via the bus, the processing units and the terminal devices are connected to the common bus by node processors. A bus control method, the so-called "contention system", is adopted in which the first node processor starting a transmission of a message from the node processor to the common bus is given the right to transmit the message when a plurality of node processors have transmission messages to send. When transmissions are simultaneously started by two or more node processors, they are inhibited, and the messages to be transmitted are assigned priorities and are retransmitted by the corresponding node processors after the lapse of waiting times of different values which are set in advance in accordance with the priorities.

13 Claims, 10 Drawing Figures

FIG. 3
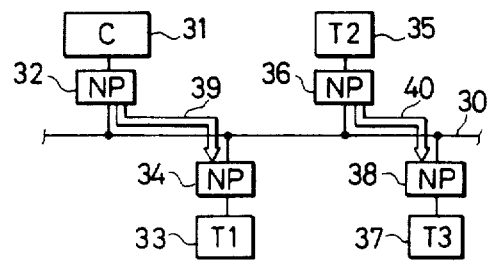
FIG. 4(a)
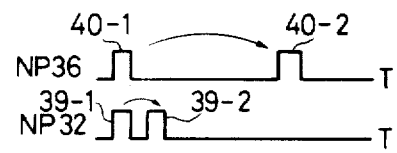
FIG. 4(b)
FIG. 5
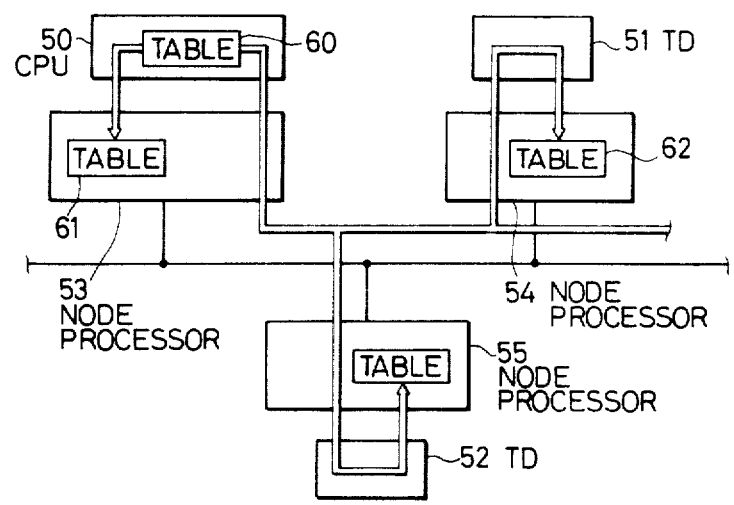

PRIORITY CONTROL METHOD AND APPARATUS FOR COMMON BUS OF DATA PROCESSING SYSTEM

BACKGROUND OF THE INVENTION

The present invention relates to a method and apparatus for controlling bus priority for use with a data processing system in which central processing units (CPUs) and terminal devices (TDs) are connected to a common bus, and more particularly, to the control of bus priority in a data processing system transmitting messages using a contention system.

FIG. 1 shows a data processing system of the type to which the present invention is applied. A plurality of central processing units (CPUs) 2 and a plurality of terminal devices 3, such as display devices or printers, are connected by node processors 4 to a transmission bus 1, but no specific bus control device is provided. Messages are transmitted and received between the units and the devices over the transmission bus 1. A system is frequently adopted in which, when a node processor 4 receives a transmission message from a central processing unit 2 or a terminal device 3, it checks whether the transmission bus 1 is busy, and then starts to transmit the message if no other node processor is using the transmission bus 1. This system is called a contention system, it has the disadvantage of the possibility of a conflict between data on the transmission bus as a result of the simultaneous start of transmission of messages from two or more node processors.

In response to this possible conflict on the transmission bus, a system has been developed in which a node processor that has detected a conflict inhibits transmission and sets a retransmission waiting time based on a predetermined algorithm using the number of conflicts as a parameter, so that it restarts transmitting the message at the end of the retransmission waiting time. A system has also been developed in which device addresses within transmission messages are compared when a conflict takes place, and the node processor having the transmission message with the device address of the highest priority is assigned the transmission right.

In the first-mentioned system, priority between transmission messages or between the corresponding devices is not taken into consideration, so that a transmission message between central processing units 2, which is to be retransmitted first, could possibly be transmitted after a transmission message between terminal devices, when transmission messages between central processing units 2 and between terminal devices 3 of FIG. 1, for example, conflict. Moreover, a message with a higher priority, such as a message addressed to a console display device or to a high-speed terminal device, could be retransmitted after a delay resulting from a conflict with a message addressed to a low-speed terminal device, such as a printer, thus raising a problem concerning the performance of the system.

On the other hand, the latter system has the defect that only the transmission message with the highest priority of all the messages assigned priorities by device address can be continuously transmitted as it is, but the device address itself cannot be changed with ease.

SUMMARY OF THE INVENTION

It is therefore an object of the present invention to control message transmission in accordance with the priority level of the message, but without resorting to device addresses.

According to the features of the present invention, in a network system of the type in which there is no specific bus control device or the like, in which all devices (such as central processing units and terminal devices) are linked by node processors to a single transmission bus, and in which each node processor transmits a transmission message using a contention system when it receives a message from a device, when two or more node processors simultaneously start transmission, each node processor detects the conflict, stops transmission, and sets an appropriate retransmission waiting time based on a message level designated in advance by the device and its starts retransmission after the lapse of the retransmission waiting time.

According to the present invention, when two node processors, for example, simultaneously transmit a message with a high message level and a message with a low message level so that a first conflict occurs between them, the retransmission waiting time of the low-level message is set to be longer than that of the high-level message. As a result, no second conflict occurs between the two node processors, so that the high-level message is transmitted before the low-level one.

For conflicts between messages of the same message level, the retransmission waiting time is determined to be within a predetermined retransmission waiting time range (i.e., between longest and shortest times within a selected range) in accordance with a random number, to reduce the possibility of second or subsequent conflicts.

The setting of a retransmission waiting time can be changed easily from a central processing unit or a terminal device, and the central processing units are able to change the settings of the retransmission waiting times of all the node processors connected to the network, either therethrough or through a terminal device. As a result, the central processing units can set the most appropriate retransmission waiting time in accordance with the number of devices connected in the network, i.e., the number of node processors, the quantity of data to be transmitted, or the usage stage of the bus, so that the usage efficiency of the system can be improved.

BRIEF DESCRIPTION OF THE DRAWINGS

FIG. 3 is a schematic view of the construction of a system, indicating the message transmission scheme of the present invention;

FIG. 4a shows an example of a waiting time table;

FIG. 4b is a timing chart of the operations of the system of FIG. 3;

FIG. 5 is a schematic diagram indicating the rewriting operation of the table in a node processor;

DESCRIPTION OF THE PREFERRED EMBODIMENT

The present invention will be described in detail in the following with reference to the accompanying drawings.

Figure 1:
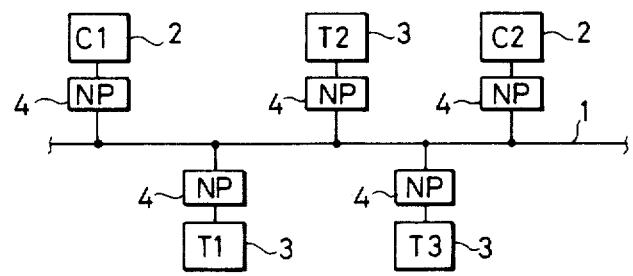
FIG. 1 shows a data processing system of the type to which the present invention is applied.
Figure 2:
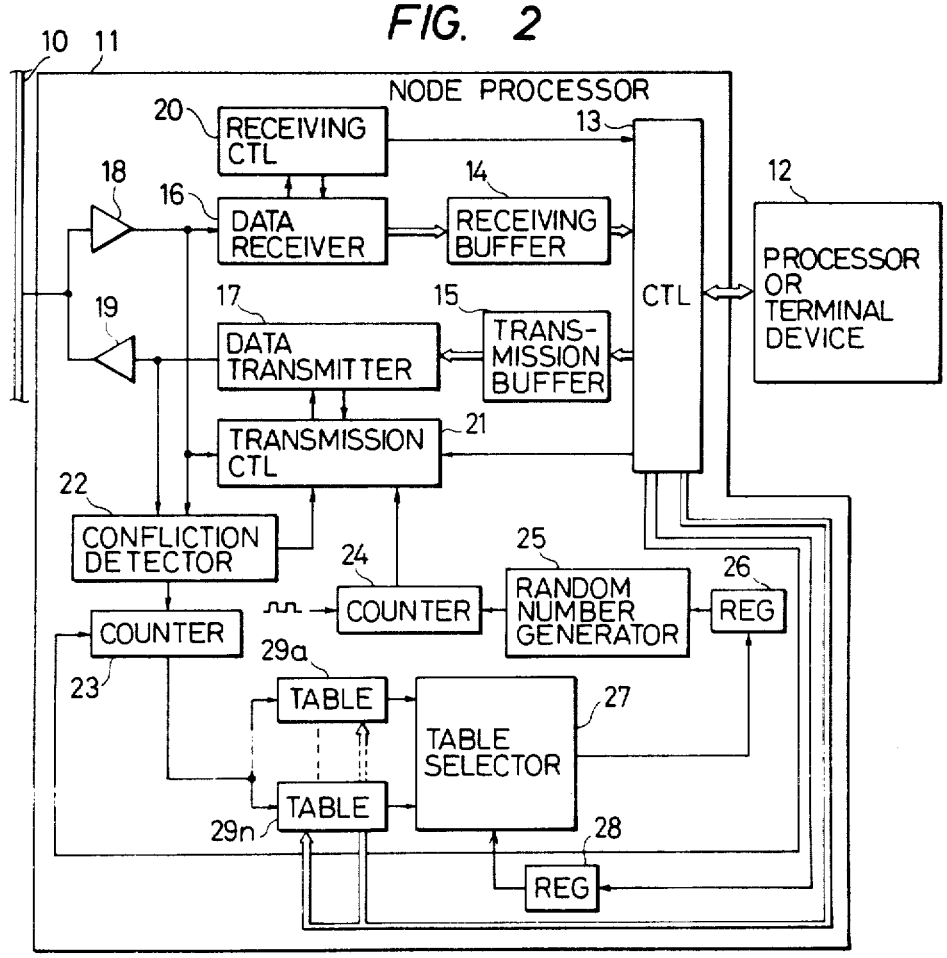
FIG. 2 shows one embodiment of a node processor of the present invention.

FIG. 2 shows an example of the circuit construction of a node processor of a bus priority control system according to one embodiment of the present invention. For simplicity of description, only the circuit construction required from an understanding of the present invention is shown in the illustration of the node processor 11 of FIG. 2.

The node processor 11 is connected between a central processing unit or terminal device 12 and a transmission bus 10. The side of the node processor 11 connected to the central processing unit or terminal device 12 is provided with a node processor controller 13 for controlling the node processor as a whole and to serve as a device-side interface. On the other hand, the side of the node processor 11 connected to the transmission bus 10 is provided with a receiver 18 and a transmitter 19 connected to the transmission bus 10. A serial data receiver 16 is connected to the receiver 18 and also to the node processor controller 13 via a receiving buffer 14. A serial data transmission 17 is connected to the transmitter 19 and also to the node processor controller 13 via a transmission buffer 15. The serial data receiver 16 is connected to a receiving controller 20, the serial data transmitter 17 is connected to a transmission controller 21, and both controllers 20 and 21 are connected to the node processor controller 13. A conflict detector 22 is connected to the transmitter 19, the receiver 18, and the transmission controller 21 and also to a conflict counter 23.

The conflict counter 23 is connected to a plurality of longest and shortest retransmission waiting time tables 29a to 29n, the outputs of which are connected by a table selector 27 to a longest-shortest retransmission waiting time register 26. The table selector 27 is connected by a message level register 28 to the node processor controller 13. A random number generator 25 is connected to the longest-shortest retransmission waiting time register 26 and also to the transmission controller 21 via a counter 24. Incidentally, the conflict counter 23 is connected to the node processor controller 13 so that it can receive a counter reset signal. The longest and shortest retransmission waiting time tables 29a to 29n are connected to the node processor controller 13 so that their contents can be changed by the central processing unit or terminal device 12.

The operations of the embodiment with this construction will be described in detail in the following. The node processor 11 receives a transmission message from the central processing unit or terminal device 12 and stores it in the transmission buffer 15 via the node processor controller 13. At the same time, the transmission controller 21 investigates how busy the transmission bus 10 is by "listening" on the bus, and actuates the serial data transmitter 17 to start transmission if no other node processor is using the transmission bus. The serial data transmitter 17 converts the parallel data in the transmission buffer 15 into serial data, and transmits the serial data to the transmission bus 10 through the transmitter 19. When the receiving controller 20 detects a message on the transmission bus 10 addressed to that node processor, the data receiver 16 is allowed to convert the received message into parallel data and store the parallel data in the receiving buffer 14. After it has received all the messages in a normal manner, the receiving controller 20 reports the received message or messages to the node processor controller 13, thus ending the receiving operation.

The description thus far has been directed to the fundamental operation of the node processor 11. However, the operation performed when a conflict occurs with another node processor will be described in detail in the following.

A conflict of transmission messages is detected, as usual in the art, by the conflict detector 22 performing an exclusive OR of the transmission data and the received data. More specifically, if there is no data on the bus from another device, the transmission data and the received data are identical, so that the exclusive OR operation will produce a result which is 0. If the received data contains data from another device, on the other hand, the received data and the transmission data will not be identical, so that the exclusive OR operation will produce a result which is 1. When the conflict detector 22 detects a conflict or collision of data in this way, it instructs the transmission controller 21 to inhibit message transmission, and transmits a signal indicating that the data which it has already transmitted on the bus is ineffective so as to reset the received data in the other node processors. At this time, the conflict detector 22 also increments the conflict counter 23, which was previously reset by the node processor controller 13 at the same time that the node processor controller 13 received the message from the central processing unit or terminal device 12 and stored it in the transmission buffer 15.

The conflict detector 22 has a function whereby the conflict counter 23 counts the number of conflicts detected within a slot time corresponding to the propogation time of the bus. In this regard, it is possible for several processors to begin transmission at substantially the same time after determining that the bus appears to be free, and due to the spacing of the node processors on the bus, a given node processor will detect the several conflicts at slightly different times within the time slot subsequent to its own start of transmission. Obviously, if more than one conflict is detected, the waiting time selected before retransmission is possible will have to be different than the case where only a single conflict is detected. However, recognizing that there are only a given number of node processors in the system, the counter 23 is not incremented when the counter 23 reaches a value above a predetermined level.

The longest-shortest retransmission waiting times corresponding to the message levels are determined in accordance with the value in the conflict counter 23, and only one longest-shortest retransmission waiting time is set in the longest-shortest waiting time register 26 via the table selector 27 in accordance with the value of the priority level in the message level register 28, which is set in advance by an instruction from the central processing unit or terminal device 12. Therefore, the number of longest-shortest retransmission waiting time tables provided must be equal to the number of assigned message levels.

Next, since the retransmission waiting time ie expressed by a number of integral multiples of a slot time determined by the propagation delay characteristics of the system, the random number generator 25 generates a random number within a range between the maximum and minimum set in the longest-shortest retransmission waiting time register 26, and the random number generated is set in the counter 24. This counter 24 is a countdown counter which is driven in synchronism with the slot time by way of an applied timing pulse derived from a time pulse generator (not shown). When the random number generator 25 outputs 0, the transmission controller 21 will again investigate whether the transmission bus 10 is busy, and instructs the serial data transmitter 17 to retransmit if no other node processor is using the transmission bus 10 at that time.

The reason the random number generator 25 is provided is to distinguish messages having the same assigned priority level. Thus, if two node processors attempt to transmit messages on the bus at the same time and have assigned to the respective message the same priority level, a repeat of the contention between these messages on retransmission would be possible if both node processors adopt the same waiting time. To avoid this, a range of waiting times is selected from the tables 29 on the basis of an assigned priority level and the number of conflicts detected, and then the random number generator 25 operates to generate a random number within the selected range. Thus, it is unlikely that both node processors would select the same waiting time.

Next, the simplest embodiment of the present invention will be described in detail with reference to FIGS. 3, 4a and 4b.

FIG. 3 shows an example of a system in which a central processing unit 31 and terminal devices 33, 35 and 37 are connected by node processors 32, 34, 36 and 38, respectively, to a transmission bus 30. The following description is directed to the case in which there is conflict on the bus 30 between a message 39 transmitted from the central processing unit 31 to the terminal device 33, and a message 40 transmitted from the terminal device 35 to the terminal device 37. In order to make the description clearer, it is assumed that the conflict counter 23 in the node processor has not counted up to a maximum value n of 4 or more. It is also assumed that there are two message priority levels for the node processors 32, 34, 36 and 38.

FIG. 4 illustrates the contents of the waiting time tables 29. Of these, table 29a is selected when the counter 23 has the value 1, and its contents are output under that circumstance. Tables 29b and 29c, respectively, output their contents when the counter 23 has the values 2 and 3-n. These tables each hold values indicating the shortest and longest waiting times of the ranges for message level 0 (i.e., the lower priority level), and values indicating the shortest and longest waiting times of the ranges for message level 1 (i.e., the higher priority level). These tables set limits for the larger value of the lower level and the largest count values.

As shown in FIG. 3, it is assumed that the transmission messages 39 and 40 each generate a first conflict on the bus 30, and that the transmission messages 39 and 40 have been assigned message levels 1 and 0, respectively, in advance by the central processing unit 31 or the terminal device 35. In this case, the node processor 36 reads out the longest and shortest retransmission waiting times from the level 0 column of FIG. 4a, and selects one value therebetween by the action of the random number generator 25 to determine its retransmission waiting time. Similarly, the node processor 32 reads out the longest and shortest retransmission waiting times from the level 1 column of FIG. 4a to determine its retransmission waiting time. As a result, the two retransmissions can be successfully conducted.

More particularly, as seen in FIG. 4b, if the conflict takes place at 39-1 and 40-1, the node processor 36 will proceed with a retransmission message 40-2, whereas the node processor 32 will proceed with a retransmission message 39-2. In other words, the high-level transmission message is transmitted before the low-level transmission message. A highly-efficient transmission can be executed if the longest and shortest retransmission waiting time tables are made to take consideration of the most appropriate value for the scale of the system, the quantity of data to be transmitted, and so on. The number of levels and the upper limit of the count values are selected in accordance with the most suitable values for the system.

FIG. 5 shows the operation of rewriting the longest and shortest retransmission waiting time tables in the node processor. As has already been described with reference to FIG. 2, the longest and shortest retransmission waiting time tables 29 of the node processor 11 can be rewritten from the processor or terminal device 12. Similarly, as seen in FIG. 5, the longest and shortest retransmission waiting time tables 61, 62 and 63 of node processors 53, 54 and 55 can be rewritten from a central processing unit 50 or terminal devices 51 and 52. The central processing unit 50 can prepare a new longest and shortest retransmission waiting time table 60, and can rewrite the longest and shortest retransmission waiting time table 61 when the scale of the system and the quantity of data to be transmitted change. The new longest and shortest retransmission waiting time table 60 can be transmitted to the terminal devices 51 and 52 over the transmission route taken by ordinary messages, to rewrite the longest and shortest retransmission waiting time tables 62 and 63 in the node processors 54 and 55 in response to instructions from the terminal devices 51 and 52. As shown in FIG. 5, means which can be recognized by the node processors 54 and 55 can be provided within messages transmitted by the new longest and shortest retransmission waiting time table 60, so that the longest and shortest retransmission waiting time table can be rewritten directly and not through the terminal devices 51 and 52.

An example of the circuit construction and its operations have been described above as an embodiment of the present invention, but the transmission counter 23, the longest and shortest retransmission waiting time tables 29a to 29n, the table selector 27, the message level register 28, the longest-shortest retransmission waiting time register 26, the random number generator 25, the counter 24, and the node processor controller 13 of FIG. 2 can be constructed within the system using a microprocessor, so that the node processor 11 can be reduced in size.

Figure 6:
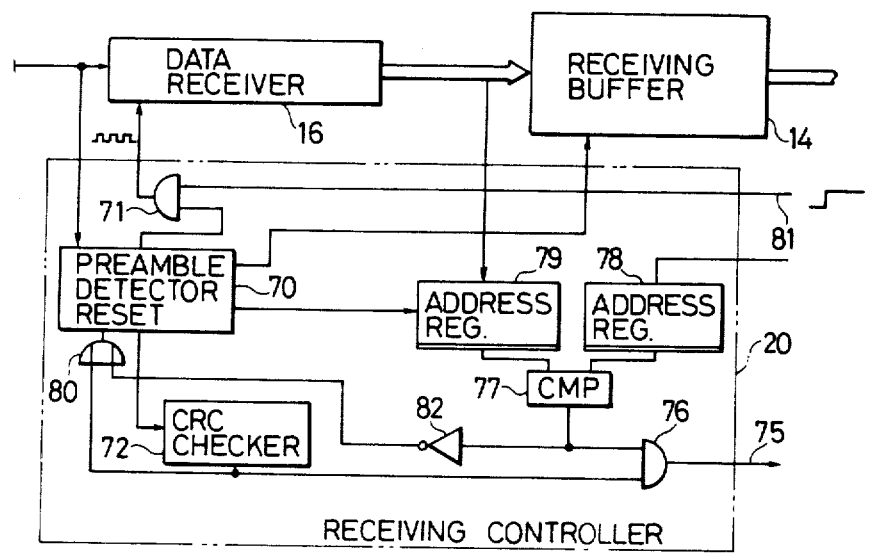
FIG. 6 is a block diagram of details of the receiving controller of FIG. 2.

FIG. 6 shows an example of the circuit construction of the receiving controller 20 of the bus priority control system according to one embodiment of the present invention. The message reception processing will be described in detail in the following. A message generally contains a preamble or flag, a remote or destination address, a transmission source address, data, and additional error-checking codes (CRC). A preamble (or flag) detector 70 establishes a one-bit-one-frame synchronization and generates a synchronizing signal when it detects the preamble (or flag) assigned to the leading end of the data on the transmission bus 10. The synchronizing signal is applied together with a reception-enabled signal 81, set by the node processor controller 13, to an AND gate 71, and an output signal from the gate 71 is supplied to the serial data receiver 16 where the data is subjected to serial-parallel conversion. The preamble (or flag) detector 70 also initializes the address for storage of data in the receiving buffer 14 simultaneously with its transmission of the synchronizing signal.

The remote address in the received message, which is first output by the parallel bus from the data receiver 16, is stored in a remote address register 79 in accordance with the instruction of the preamble (or flag) detector 70, and is compared with a comparator 77 with the address of the terminal device 12, which is stored in advance in an own-terminal address register 78. When the result of the comparison reveals that there is no coincidence between the remote address and the own-terminal address, the message is judged to be not for that device. This resets the preamble (or flag) detector 70 via the inverter 82 and gate 80 so that it is again in a condition awaiting preamble (or flag) detection. In this case, the further serial-parallel conversion of the serial data receiver 16 is inhibited.

On the other hand, the incoming message is also applied through the detector 70 to a CRC (Cyclic Redundancy Check) checker 72, which is actuated by the detection of the preamble (or flag) by the preamble (or flag) detector 70, and executes a well-known CRC on the message received. This CRC checker 72 is inhibited when the preamble (or flag) detector 70 is reset. On the other hand, when a proper preamble is detected and it is determined that the message is for that device, the CRC check of the message is completed and a check-end signal is output to an AND gate 76 and to the preamble (or flag) detector 70 via gate 80 if the message is received error-free. A signal output from the AND gate 76 is reported as a message-received signal 75 to the node processor controller 13.

Figure 7:
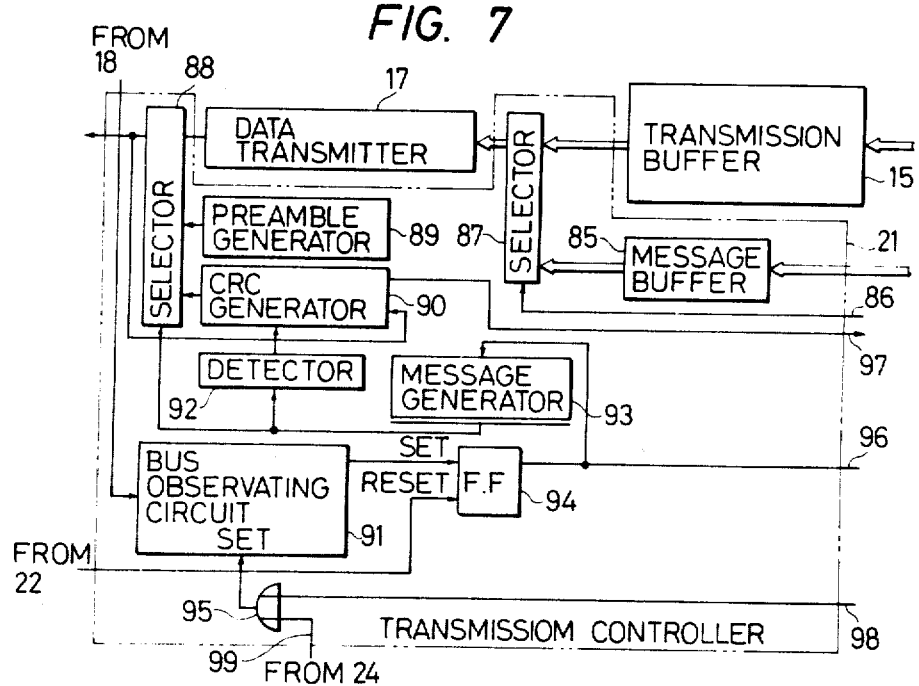
FIG. 7 is a block diagram of details of the transmission controller of FIG. 2.

FIG. 7 shows an example of the circuit construction of the transmission controller 31 of the bus priority control system according to one embodiment of the present invention.

The node processor controller 13 actuates a bus observing circuit 91 by means of a transmission instruction signal 98, applied via gate 95, after it has stored the transmission message in the transmission buffer 15. The bus observing circuit 91 checks whether the transmission bus 10 is busy by detecting any data on the bus, and sets a transmission instruction flip-flop 94 if it is determined that no other node processor is using the transmission bus 10. If data is detected on the bus 10, the bus observing circuit 91 continues its monitoring while the transmission bus 10 is busy, and does not set the transmission instruction flip-flop 94 until the transmission bus 10 can be used.

The set transmission instruction flip-flop 94 actuates a message generator 93. The content of the transmission instruction flip-flop 94 also can be read out as a transmission display signal 96 to the node processor controller 13. The actuated message generator 93 controls a selector 88 in response to a synchronizing signal (not shown), and puts together data from a preamble generator 89, the serial data transmitter 17, and a CRC generator 90 to generate the transmission message. A detector 92 is used to detect from the output of the message generator 93 that data from the serial data transmitter 17 is being selected and to actuate the CRC generator 90 in response thereto. A transmission-end signal 97 is generated by the CRC generator 90 after the CRC generation and is applied to the controller 13.

A response message buffer 85 is a buffer which is provided for storing a response message generated when the transmission message is awaiting transmission in the transmission buffer 15, after a message addressed thereto has been received. In this case, the node processor controller 13 can transmit the response message before the transmission message waiting in the transmission buffer 15 by storing the response message in the response message buffer 85 and controlling a selector 87 in response to a buffer-changing signal 86 received from the controller 13.

When the transmission message conflicts with a message from another node processor, the transmission instruction flip-flop 94 is reset in response to a detection signal from the conflict detector 22. As a result, the message generator 93 is inhibited so that message transmission is inhibited. Retransmission is conducted in accordance with the algorithm of the present invention as a result of the counter 24 generating a transmission instruction signal 99, which is applied to the bus observing circuit 91 via gate 95. The subsequent processing is similar to that when the transmission instruction signal 98 is generated.

Figure 8:
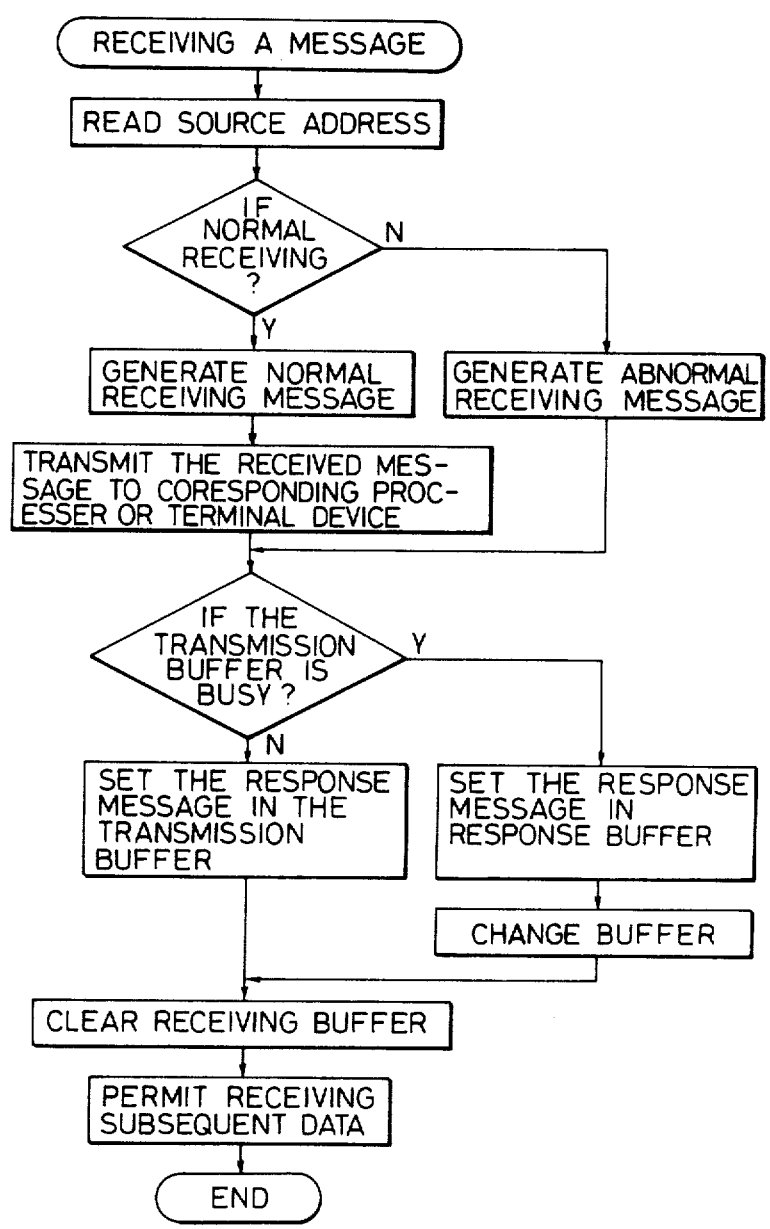
FIGS. 8 and 9 are flow charts of the operation of the node processor controller of FIG. 2.

FIG. 8 is a flow chart of the processing of a message received by the node processor controller 13 of the bus priority control system according to one embodiment of the present invention.

In the present embodiment, the node processor controller 13 is a microprogram implemented processor. The processor inhibits the reception of subsequent data by not generating the reception-enabled signal 81 when the reception of a message is reported by the message receive signal 75, so as to prevent the received message from being lost from the receiving buffer 14. The node processor then reads out the source address from the buffer 14, and judges whether it is a normal reception requiring generation of a normal receiving message in accordance with the judgment result. If reception is normal, the node processor transmits the received message to the processor or terminal device corresponding to the node processor.

The response message, if any, is set in the transmission buffer, if this buffer is not busy, and is transmitted to the device indicated by the source address in response to generation of the transmission instruction signal 98. If the buffer is busy, the response message is set in a corresponding message buffer (not shown) and is transmitted by connecting the response message buffer instead of the transmission buffer to the data transmitter. After that, the receiving buffer is cleared to enable the reception of subsequent data.

Figure 9:
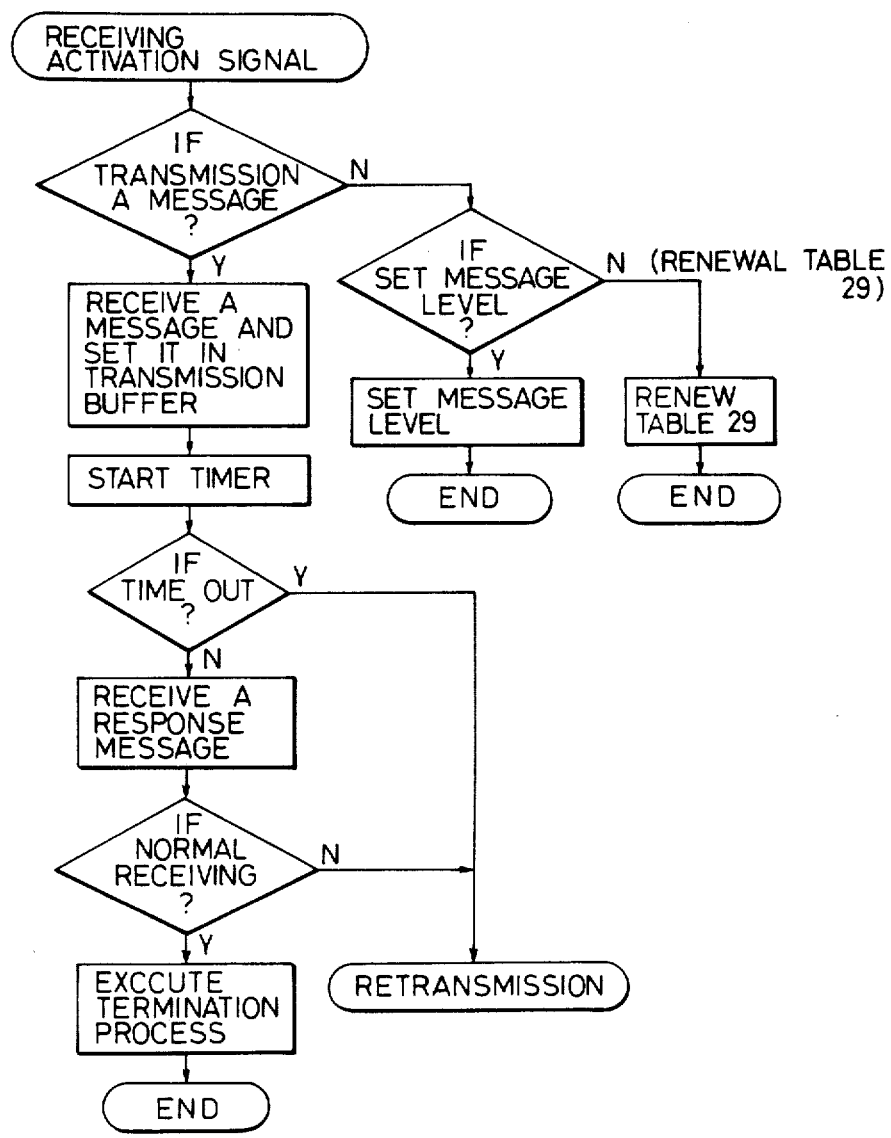

FIG. 9 is a flow chart of the processing at the activation from a terminal of the node processor controller 13 of the bus priority control system according to one embodiment of the present invention.

If a node processor receives an activation signal from the processor or terminal device connected herewith, and if the activation signal indicates message transmission, it receives the message to be transmitted and sets it in the transmission buffer. The processor then transmits that message over the transmission bus. After transmission, the processor starts a timer and executes termination processing if it receives a response message indicating normal reception before time out, to end the message transmission. If no normal response message is received before time out, the processor executes a retransmission of the message.

When the activation from the processor instructs the setting of the message priority level, the node processor sets a new message level in the register 28. For any other activation, the node processor accepts it as an instruction for rewriting the tables 29, and rewrites the tables 29 in accordance with information transmitted from the processor or terminal device. This operation of rewriting the tables 29 is not done often, the usual sequence followed is that a message is transmitted after its level has been rewritten.

The present embodiment having the construction thus far described can provide the following effects.

(1) In the contention system, when node processors simultaneously start message transmission, a retransmission waiting time is automatically changed in accordance with message priority levels which are set in advance for each of the messages. As a result, the message with the highest level can be assigned priority to use the transmission bus. Since random numbers are used to determine the retransmission waiting times, there is little possibility of second or subsequent conflicts between equal message levels.

(2) The retransmission waiting times for each of the message levels of the node processor can be rewritten from a central processing unit or a terminal device. Moreover, the retransmission waiting times of all the node processors connected to the transmission bus can be rewritten by a single central processing unit. As a result, the most appropriate retransmission waiting time can be set in accordance with the scale and the load on the system, so that the usage efficiency of the transmission line can be improved.

While I have shown and described one embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are obvious to one of ordinary skill in the art.

What is claimed is:

1. A contention system for controlling the transmission of messages on a bus, including at least one processing unit, a plurality of terminal devices, a bus, and a plurality of node processors respectively connecting said processing unit and said terminal devices in common to said bus, each of said node processors comprising:

message transmission means connected to receive data from said processing unit or a terminal device for applying said data as part of a message to said bus;

message reception means connected to receive a message including data from said bus for applying the data in said message to said processing unit or a terminal device;

message conflict detecting means connected to said bus for detecting that said message transmission means has applied a message to said bus at substantially the same time as at least one other node processor has applied a message to said bus with the result that a conflict occurs in which two or more messages or parts thereof are being transmitted on said bus simultaneously;

priority storage means connected to receive a priority signal from said processing unit or a terminal device for storing one of a plurality of priority levels assigned to a message to be transmitted;

waiting time storage means for storing a plurality of different waiting time values corresponding to respective priority levels;

waiting time determination means responsive to said message conflict detecting means detecting a conflict on the bus for selecting a waiting time value stored in said waiting time storage means in accordance with the priority level stored in said priority storage means, and including means for generating a transmission enable signal upon expiration of said selected waiting time; and transmission control means responsive to a transmission enable signal from said processing unit or terminal device or from said waiting time determination means for controlling said message transmission means to apply a message to said bus, and including means responsive to said message conflict detecting means detecting a conflict on the bus for temporarily inhibiting said message transmission means until said transmission enable signal is generated by said waiting time determination means.

2. A system as set forth in claim 1 wherein said waiting time storage means is provided with a plurality of different waiting times for each priority, and wherein said waiting time determination means includes means for selecting at random one of said plurality of different waiting times designated according to the priority stored in said priority storage means.

3. A system as set forth in claim 1 wherein said waiting time storage means stores waiting times which are shorter for higher priorities.

4. A system as set forth in claim 1, further comprising counting means connected to said message conflict detecting means for counting the number of different messages detected during a conflict on the bus which has arisen by reason of other nodes simultaneously starting message transmission on the bus, wherein said waiting time storage means stores a plurality of different waiting times for each number of messages detected during a conflict on the bus and in accordance with each respective priority level, and wherein said waiting time determination means reads out said plurality of different waiting times in response to said priority storage means and said counting means and selects one waiting time at random therefrom.

5. A system as set forth in claim 1, further comprising means for rewriting said priority storage means in response to control from said processing unit or a terminal device to change the designation of priority level therein.

6. A system as set forth in claim 4 wherein said waiting time storage means stores waiting times which are shorter for lower numbers of messages detected during a conflict on the bus.

7. A message transmission control method for controlling message transmissions in a system of the type in which processing units and terminal devices are each connected by a respective node processor to a common bus, the transmission of messages from said node processors to said bus being controlled by a contention system, comprising the steps of:

(a) assigning a priority to a message to be transmitted, (b) inhibiting message transmission when message transmissions are started simultaneously from more than one of said node processors; and (c) retransmitting a message whose transmission has been inhibited after the lapse of a predetermined waiting time which varies according to said assigned priority.

8. A message transmission control method as set forth in claim 7 wherein said predetermined waiting time is selected not only in accordance with said assigned priority but also in accordance with the number of node processors which attempt to simultaneously start message transmissions on said bus.

9. A message transmission control method as set forth in claim 7 wherein a plurality of different waiting times are provided for each assigned priority, and wherein said predetermined waiting time is selected at random from said plurality of different waiting times which vary according to the assigned priority.

10. A message transmission control method as set forth in claim 8 wherein a plurality of different waiting times are provided for each assigned priority and in accordance with the number of node processors which attempt to simultaneously start message transmissions on said bus, and wherein said predetermined waiting time is selected at random from said plurality of waiting times which correspond to the assigned priority and number of node processors which attempt to simultaneously start message transmissions.

11. A message transmission control method as set forth in claim 7 wherein shorter waiting times are set for higher priorities.

12. A message transmission control method as set forth in claim 8 wherein shorter waiting times are set for lower numbers of node processors which attempt to simultaneously apply messages for transmission on said bus.

13. A message transmission control method as set forth in claim 12 wherein the waiting time does not vary according to the number of node processors which attempt to simultaneously effect message transmission when said number is above a predetermined value.

* * * * *